(12) United States Patent
Padan

(10) Patent No.: US 8,016,238 B2
(45) Date of Patent: Sep. 13, 2011

(54) SYSTEM AND METHOD FOR ENHANCING THE FUEL STORAGE VOLUME AND THE FUEL CARRIAGE CAPACITY OF EXTERNAL FUEL STORES CARRIED BY AN AERIAL VEHICLE

(76) Inventor: Nir Padan, Moshav Sade Yitzhak (IL)

( * ) Notice: Subject to any disclaimer, the term of this patent is extended or adjusted under 35 U.S.C. 154(b) by 865 days.

(21) Appl. No.: 10/516,668

(22) PCT Filed: Dec. 4, 2002

(86) PCT No.: PCT/IL02/00976
§ 371 (c)(1),
(2), (4) Date: Aug. 12, 2005

(87) PCT Pub. No.: WO03/102509
PCT Pub. Date: Dec. 11, 2003

(65) Prior Publication Data
US 2006/0108476 A1    May 25, 2006

(30) Foreign Application Priority Data
Jun. 3, 2002 (IL) .......................................... 149988

(51) Int. Cl.
*B64D 37/02* (2006.01)
*B64D 37/04* (2006.01)
*B64D 37/12* (2006.01)
(52) U.S. Cl. .............. 244/135 R; 244/137.4; 244/135 C
(58) Field of Classification Search .............. 244/135 R, 244/135 A, 135 C, 137.4; 89/1.54
See application file for complete search history.

(56) References Cited

U.S. PATENT DOCUMENTS

| | | | | |
|---|---|---|---|---|
| 2,381,400 A | * | 8/1945 | Stavely et al. | 244/135 R |
| 2,381,402 A | * | 8/1945 | Weber et al. | 244/135 R |
| 2,382,412 A | * | 8/1945 | Grey et al. | 222/383.2 |
| 2,421,699 A | * | 6/1947 | Johnson | 244/135 R |
| 2,507,069 A | * | 5/1950 | Farley | 244/135 R |
| 2,537,369 A | * | 1/1951 | Ostroff | 244/218 |
| 2,591,913 A | * | 4/1952 | Bowers et al. | 244/135 R |
| 3,009,671 A | * | 11/1961 | Johnson | 244/135 R |
| 3,468,501 A | * | 9/1969 | Baum | 244/137.4 |
| 4,589,615 A | * | 5/1986 | Walker, Jr. | 244/137.4 |
| 4,790,350 A | * | 12/1988 | Arnold | 137/588 |
| 5,190,250 A | * | 3/1993 | DeLong et al. | 244/137.1 |
| 5,660,358 A | * | 8/1997 | Grafwallner et al. | 244/135 R |
| 5,927,651 A | | 7/1999 | Geders et al. | 244/135 B |
| 6,231,009 B1 | | 5/2001 | Kong | 244/135 R |

* cited by examiner

*Primary Examiner* — Tien Dinh
*Assistant Examiner* — Philip J Bonzell

(57) ABSTRACT

A system and method for enhancing the fuel stores volume of an aerial vehicle is disclosed. An extended external fuel stores configuration utilizes an alternative fuel transfer path. An external fuel tank is suspended on a external fuel tank carrier pylon uploaded on a outboard wing "pseudo-wet" stores station. The pylon is linked to a dual functionality external fuel tank carrier pylon uploaded on an inboard wing "wet" station. The pylon is capable of transferring fuel from an external fuel container to the aircraft fuel system and capable of transmitting, and controlling the fuel store in the auxiliary fuel container attached to the pylon uploaded on a outboard wing "pseudo-wet" station. An externally mounted stores transfer kit links the inboard pylon and the outboard pylon.

21 Claims, 4 Drawing Sheets

SYSTEM AND METHOD FOR ENHANCING THE FUEL STORAGE VOLUME AND THE FUEL CARRIAGE CAPACITY OF EXTERNAL FUEL STORES CARRIED BY AN AERIAL VEHICLE

BACKGROUND OF THE INVENTION

1. Field of the Invention

The present invention relates to aircraft fuel storage and delivery systems, in general and more particularly to a system and method for providing aerial vehicles with an extended external fuel stores configuration in order to increase effectively the fuel storage volume and fuel carriage capacity of the aerial vehicles.

2. Discussion of Related Art

The propulsion system of a typical aerial vehicle includes one or more power plants, such as engines, providing thrust and lift to the vehicle and associated fuel storage means, such as fuel tanks, to hold the fuel that feeds the power plants via appropriate fuel delivery means, such as fuel lines. The fuel storage means are distributed within and across the surface aerial vehicle in a volumetrically optimal manner. The manner of distribution differ among different types of aircraft but typical fuel stores consist of a plurality of potentially interconnected internal fuel containers, such as fuel tanks or fuel cells installed within the internal space of the fuselage or within the internal space of the wings. As the range, performance and efficiency of an aircraft depend among other factors on the quantity of fuel the aircraft is carried there is a constant research and development effort to optimize the quantity of fuel carried by an aircraft. The process is particularly significant in military combat aircraft due to the highly complex requirements expected from a combat aerial vehicle. A combat aircraft should have a substantially small size, power plants relatively large in relation to the body, advanced life support systems for the crew, advanced communications, command, control, safety, protection, high performance and a large variety of weapon stores. In order to increase the range, radius of action, and loiter time of a military aircraft as much as possible in addition to the internal fuel stores typically external fuel stores are carried. External fuel stores consist of aerodynamically structured fuel containers detachably carried on specific carriers, such as pylons, detachably installed on the lower wing area or the lower fuselage area of the aircraft. The carriage of external fuel stores further require the installation of an auxiliary fuel delivery and control system that enable the provision of fuel from the external stores to the engine in a controlled manner where the external system is integrated seamlessly with the internal fuel system. Thus, the external fuel system should include fuel tank carrier pylons for the carriage of the external fuel tanks, fuel delivery lines, power lines, and fuel delivery monitoring and control lines. In a typical military aircraft these elements are pre-designed and integrated into the aircraft systems during the design, development and manufacturing process.

The addition of external fuel stores substantially improves the range of the aircraft. Range is particularly critical to military aircraft. External fuel stores are force multipliers in the sense that an aircraft carrying external stores is capable of performing longer and therefore more efficient missions. The quantity of the fuel carried within the external stores is a function of the volume of the external fuel tanks and the number of the external fuel tanks installed. A wide variety of carriage capabilities provided according to the type of aircraft, mission objectives, and the like. A combat aircraft typically carries two or four external tanks under the wings and one or more external tanks on the underside of the fuselage. As a typical external tank holds about 260 to 600 gallons of fuel an optimally configured external fuel store is capable of significantly increasing the range of a combat aircraft.

External stores are typically attached to an aerial vehicle via specifically pre-determined locations distributed across the external surface of the aircraft typically referred to hard points, weapon stations, or external stores stations. Hard points capable of supporting functional fuel stores are typically referred to as "wet" points. "Wet" points provide not only appropriate suspension devices but also functional interfaces to the aircraft fuel system, such as specific fuel delivery line connections, electrical connectors utilized as monitoring and control interfaces and the like. A typical military aircraft includes a plurality of other hard points, weapon stations or external stores stations for the carriage of a variety of diverse aircraft stores, such as missiles, heavy ordnance, electronic counter measures, thrust augmentation units, and the like. These hard points are typically referred to as "dry" points. Some hard points (typically located on inboard stores stations) have dual functionality in such a manner that they are capable of supporting both "dry" stores such as heavy ordnance and "wet" stores such as external fuel tanks. Obviously "dry" points, which are typically located on outboard stores stations, are incapable of carrying functional external fuel stores due to the lack of fuel system delivery, fuel monitoring and fuel control interfaces required to be associated with the stations. The limitation concerning the carriage of external fuel stores on a limited number of hard points is a disadvantage to an aircraft as it substantially limits the range, the performance and the mission versatility of the aircraft.

For economical efficiency, organizational and operational reasons most military aerial vehicles are designed as multirole platforms. Consequently modern military aircraft are provided with functional versatility, such as the capability of conducting a variety of missions including offensive counterair (OCA), defensive counterair (DCA), interception (AA), combat air patrol (CAP), close air support (CAS), suppression of enemy air defenses (SEAD), deep strike, antishipping (AS), anti-submarine warfare (ASW), electronic warfare (EW), reconnaissance, surveillance, or the combination of two or more of the above. Each specific mission profile requires weapon pairing or the assignment of optimal weaponry for the given mission. Weapon pairing involves the delivery of a particular load of a particular store or a specific mix of different store types and loads. The wide range of mission profiles required from modern military aerial vehicle necessitates the option of carrying a variety of stores and loads. As weapon pairing is a complex process an optimal stores carriage configuration for each required specific mission configuration is not always practical. As a result it is often the case that an aircraft performs a combat mission while carrying stores and loads below the maximum permissible carriage capacity, and even with non-utilized (empty) weapon stations. For example, for the performance of a long-range mission, such as imagery intelligence gathering, which requires a relatively limited load of weapons (for self-defense only) but needs substantially large quantities of fuel, the designated aircraft may take off with a non-optimal external stores configuration. The fuel load will be insufficient for the performance of the mission while some of the available "dry" weapon stations will not be usefully utilized. Similarly an aircraft prepared for an Air-to-Air mission (A/A) is typically required to carry air-to-air missiles only. In both of the above mentioned exemplary missions the stores carriage capacity of the vehicle is utilized in a non-optimal manner, as some of the available weapon stations are not usefully employed.

In order to enhance the range and the mission capabilities of an aerial vehicle the technique of aerial refueling was conceived, designed, and developed. Air refueling became a widely used technique wherein the fuel stores of an aircraft are periodically replenished in-flight from the stores of a specific tanker aircraft. Although this is a universally known, extensively refined and widely accepted procedure in the air forces of the world and under some circumstances its use is unavoidable, the technique has a number of disadvantages. Air refueling is a complex operation demanding very precise timetables, pre-defined rigid procedures, accurate maneuvering and very intensive planning. The operation is expensive in terms of the number of tanker aircraft required, which are typically high-priced large aerial vehicles flown and operated by a large extensively trained crew. The operation is highly problematic at night when lights should be used and practically impossible in adverse weather conditions. Additionally the insertion of tanker aircraft into a combat zone is a highly risky operation. Thus, tankers typically operate out of the limits of the combat zone. This fact necessitates that a receiving combat aircraft, which is low on fuel to break off the engagement or the mission, leave the combat area, spend a substantially extended period of time performing refueling and then return to the combat. When dealing with a complex air campaign involving hundreds of "shooters" and dozens of tankers it will be easily perceived that a high degree of inefficiency is involved in a campaign where the overall planning is based on aerial refueling as the force multiplier.

Another solution to the problem concerning the fuel quantity limitation of aircraft involves supplementing the external fuel stores by the addition of auxiliary fuel tanks to an aircraft. As the internal space of a typical aircraft is utilized to its full capacity the only option is the addition of external fuel tanks. As the number of "wet" points capable of carrying fuel stores is typically pre-defined and limited, in order to add auxiliary external fuel tanks the re-design and the modification of an existing "dry" point is required by the conversion of the original hard point to a dual functionality "wet/dry" point. Such a conversion is a long, expensive and complex process as it typically involves considerable changes in the internal structure of the aircraft, in the configuration of the internal fuel system, the associated control and monitoring systems, and the like. As was mentioned above the internal space of a modern military aircraft is already fully packed with a variety of critical equipment. Therefore installing additional equipment and re-arranging the configuration of existing equipment unavoidably involve complex procedures, high costs and high risks.

It will be easily perceived by one with ordinary skill in the art that there is an urgent need for a system and method to enhance the fuel carriage capacity of an aerial vehicle without the need to resort to extensive internal modifications in the structure of the aircraft and without extensively modifying the existing fuel systems of the aircraft. Preferably the system and method should be "transparent" to the aircraft and should be developed in manner as to be to be made substantially generic to a group of similar aerial vehicles.

SUMMARY OF THE INVENTION

One aspect of the present invention regards a system for increasing the fuel storage volume and the fuel carriage capacity of external fuel stores suspended on an aerial vehicle. The system is operative in the formation of at least one external extended fuel stores configuration. The system includes the elements of at least one dual functionality external fuel tank carrier pylon providing fuel tank carriage capability and fuel transfer and control capabilities from at least one externally carried fuel tank and to support fuel transfer and control capabilities for at least one associated single functionality external fuel tank carrier pylon carrying at least one external fuel tank, at least one single functionality external fuel tank carrier pylon providing fuel tank carriage capability and fuel transfer and control capabilities from at least one externally carried fuel tank, and at least one externally-mounted Stores Transfer Kit to provide at least one aerodynamically shaped enclosure for at least one external fuel line and at least one external fuel control line linking between the at least one single functionality external tank carrier pylon and the at least one dual functionality external tank carrier pylon, whereby an at least one alternative external fuel transfer and fuel control path is established between the at least one external fuel tank carried by the at least one single functionality external fuel tank carrier pylon and the fuel system of the aerial vehicle via the at least one externally-mounted Stores Transfer Kit, and the at least one dual functionality external fuel tank carrier pylon.

A second aspect of the present invention regards a method for increasing the fuel storage volume and the fuel carriage capacity of external fuel stores suspended on an aerial vehicle. The method is operative in the formation of an external extended fuel stores configuration. The method includes steps of: converting or designing a new at least one standard external fuel tank carrier pylon in order to provide support for the transfer, monitoring and control of a fuel store held in at least one fuel contained suspended on an adjacent external fuel tank carrier pylon, developing at least one novel external fuel tank carrier pylon in order to provide the transfer of fuel stored in a carried external fuel tank to the aircraft fuel system via the at least one converted or designing a new external fuel tank carrier pylon, and developing at least one externally-mounted Stores Transfer Kit to provide external extension fuel and control lines between the at least one converted or designing a new external fuel tank carrier pylon and the at least one novel external fuel tank carrier pylon; thereby forming an alternative external fuel transfer path between an at least one external fuel tank suspended on the at least one novel external fuel tank carrier pylon via the at least one externally-mounted Stores Transfer Kit, via at least one converted external fuel tank carrier pylon, to the fuel system of an aerial vehicle.

BRIEF DESCRIPTION OF THE DRAWINGS

Various advantages of the present invention will become apparent to one skilled in the art by reading the following specification and subjoined claims and by referencing the following drawings in which:

DETAILED DESCRIPTION OF THE PREFERRED EMBODIMENT

Figure 1:
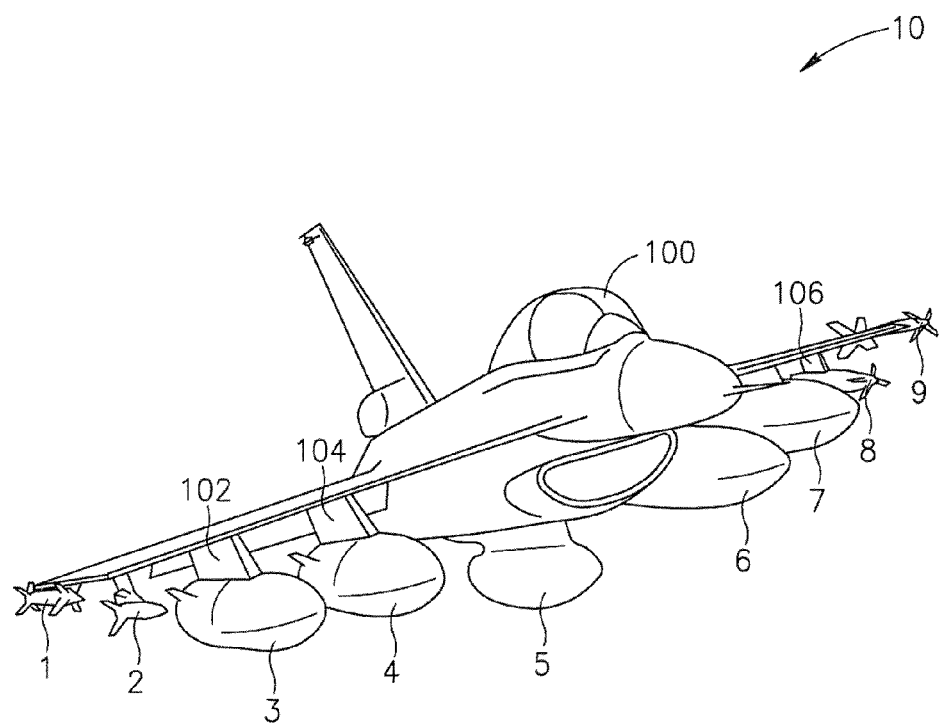
FIG. 1 is a perspective view of an exemplary aircraft shown with an extended external fuel stores configuration, in accordance with the preferred embodiment of the present invention.

A system and method for enhancing the fuel storage volume and the fuel quantity of external fuel stores carried by an aerial vehicle is disclosed. The proposed system and method provides an extended external fuel stores configuration the components of which are transparently integrated into the existing external fuel system and the internal fuel system of an aircraft. The proposed system includes one or more auxiliary external fuel tank suspended on suitably modified or newly designed fuel tank carrier pylons referred to herein after as the "supplier pylons". The supplier pylons are attached to weapon stations functionally converted from a "dry" hard point to a dual functionality "pseudo-wet/dry" hard point. Fuel lines, and compressed air lines are linked to the supplier pylons from adjacent specifically modified fuel tank carrier pylons referred to hereinafter as the "receiver pylons". This linkage could optionally include fuel quantity monitoring lines, power lines and fuel delivery control lines. The linkage between the pylons is established via a specifically developed externally mounted Stores Transfer Kit (STK) assembly. The STK is installed suitably on the underside of the aircraft wing and extends in a conformal manner across the wing surface. The STK assembly includes a conformal covering having aerodynamic structure that envelops substantially the upper parts of both the supplier pylon and the associated receiver pylon. The STK further includes extension fuel lines and extension compressed air lines linking the supplier pylon to the associated receiver pylon. The assembly could optionally include extension power lines and extension data control links. The conformal covering of the STK provides for aerodynamic efficiency, such as optimal drag index. The STK enables the functional modification of a hard point without applying any structural changes on the surface of the wing or within the internal space of the wing.

In order to implement the proposed system and method the certain functional and structural modifications would be applied to an existing fuel tank carrier pylon designed to be uploaded on a pre-defined "wet" point. The pylon is modified in order to be converted to a dual functionality fuel tank carrier pylon. The pylon utilized could also be of a completely new design. The converted dual functionality pylon should be able to function both as 1) an independently operating pylon, i.e. a carrier device of a conventional fuel tank and a supporter device for the delivery, control and monitoring of the fuel load stored in the conventional fuel tank in the original manner defined, designed, and manufactured for the aerial vehicle and 2) in addition to the original functionality as described in (1) the pylon is endowed with the capability of linking to extension lines connecting to a novel supplier pylon, via which fuel is transferred from a conventional fuel tank suspended on the supplier pylon to the modified pylon and from there in turn to the aircraft fuel system.

The concept underlying the proposed system and method of the present invention involves the utilization of a specifically designed and developed mechanism referred to as a "Stores Transfer Kit" (STK) installed between a pylon attached to a "wet" station and a pylon attached to a "dry" station. Fuel is transferred specifically from a fuel tank uploaded on the pylon attached to the "dry" station via the STK to the pylon attached to a "wet" station. All the attachments of the STK will be made to the fuel pylons only including the aerodynamic fairing beneath the wing surface. All the required interfaces of the STK will be designed in the modification of existing pylons as well as in the design of new pylons.

The implementation of the proposed system and method further necessitates the development of a novel externally mounted Stores Transfer Kit (STK) and a novel supplier pylon. The STK includes an aerodynamically shaped conformal covering enclosing a set of extension lines, such as fuel files, compressed air lines, optional power lines and optional data links where the set of extension lines forms a functional link between the modified "receiver" pylon and a novel "supplier" pylon. The supplier pylon is a specifically designed and developed fuel tank carrier pylon with the capability of being linked to the STK in order to enable the transfer of fuel from a conventional fuel drop tank via the extension lines to the modified "receiver" pylon and from there in turn to the aircraft fuel system.

The implementation of the proposed system and method necessitates the performance of the standard testing procedures for proving the suitability of diverse fuel tanks having a pre-determined type, size and volume, as fuel stores containers used as operative elements in the extended fuel stores configuration. The testing procedures will further provide for the aircraft-specific STK design and suitability and optimized performance. A sequence of known design steps, ground tests and flight tests is necessary in order to determine the aerodynamic capability and flight restrictions of a vehicle having the relevant configuration. Since the fuel stores carried by the novel supplier pylons is typically consumed in the initial stages of a mission the flight limitations associated with the application of the proposed extended fuel stores configurations could be applied to the aircraft in a partial manner such as for the initial period of the mission. Consequent to the consumption of the fuel in the supplier pylons the novel components of the proposed system, such as the supplier pylons and the STKs could be jettisoned in order to eliminate the flight envelope limitations and to restore the original aerodynamic characteristics of the aerial vehicle for the rest of the mission If accepted and implemented.

The proposed system and method have a number of advantages in comparison with other existing or prospective solutions in comparison with other existing and/or proposed solutions. One advantage relates to increasing the fuel quantity carried by an aerial vehicle in association with the problem of range versus stores carriage capacity of a military aircraft. The quantity of fuel carried by the associated aerial vehicle will be increased by about 20% to 60%. Consequently the operational radius of the aerial vehicle will be increased by about 10% to 25% and CAP times could be increased by up to about 100% (as a function of CAP range).

Another advantage of the proposed system and method regards the option of fielding a limited number of systems and continuously porting the systems among different aircraft in accordance with the operational requirements.

Additional advantage of the proposed system and method concerns substantial cost-effectiveness in comparison with other solutions, such as for example the Conformal Fuel Tanks (CFT) solution, as no structural changes (having regressive effects in the long run associated with the operational lifetime of the airframe) in the aircraft wing or body of the aircraft are necessary, and as it could utilize existing large stocks fuel tanks already maintains in storage.

Another advantage concerns the operational implementation of the elements of the invention on an aircraft in a substantially flexible manner without impending and degrading in any way the original functions of the aircraft or the predefined operations of the external stores. The operative components of the system, such as the STKs, the receiver pylons and the supplier pylons could be installed temporarily (within only about 2 hours) on an aircraft for the performance of a specific mission. Furthermore consequent to the performance of a specific mission requiring a substantially increased quantity of fuel, the operative components of the system could be readily uninstalled within short time to provide the aerial vehicle with a different external stores configuration.

Yet an another advantage of the proposed system and method relates to the substantially enhancement of the range of possible external stores configurations in order to provide the optimal weapon pairing for a mission. For example, the utilization of precision guided ammunition, such as a JDAM type ordnance, Popeye, and the like, with considerably enhanced hit and destroy ratios will allow for an asymmetrical external configuration such that the carriage of the precision guided ordnance under a specific wing and carriage of the combination of a "receiver" pylon, "supplier" pylon and the STK under the opposite wing. Another enhanced stores configuration designed for the performance of an air-to-ground could involve the carriage of four bombs under the fuselage and the carriage of two fuel tanks and the associated STK under each wing. Several novel configurations could be contemplated.

Another advantage of the system and method is that the integration with the aircraft fuel system is substantially "transparent". Due to the appropriate connections of the STK between the supplier pylons and the receiver pylons, the fuel, compressed air, and optionally power and control signals flow from and into the aircraft fuel system via the existing connections of the receiver pylons only. Thus, theoretically the aircraft fuel system could recognize only the receiver pylons and the standard fuel tanks suspended thereon.

Although in the preferred embodiment of the present invention the representative aerial vehicle is the Lockheed Martin F-16 Fighting Flacon multi-role fighter and all its variants, it would be easily understood that in other preferred embodiments various other aircraft having the basic capability of carrying external fuel stores could benefit from the advantageous features of the of the invention. In the preferred embodiment two additional external fuel tank carrier pylons will be releasably attached to the outboard weapon stations 3 and 7 of the representative aircraft (F-16) while the extended fuel, compressed air and the optional control lines will be supplied from the original external fuel carrier pylons attached on the inboard weapon stations 4 and 6 respectively via the STK. Note should be taken that in other preferred embodiments other weapon stations could be used and the number of the additional external fuel carrier pylons could differ. The following description of the preferred embodiment is exemplary only and is provided for the ready understanding of the invention. The description is not meant to be limiting in any way and the limits of the invention are defined only by the attached claims.

It should be stressed that the F-16 as the representative carrier platform and the representative store types described in the preferred embodiments are exemplary only and not meant to be limiting as the list of aerial vehicles that the proposed system and method could be applied practically to all military aerial vehicles in service, as well as a wide variety of new generation aerial vehicles in design, development, or testing stages. The system and method could also pertain to various specialized civilian aerial vehicles utilized for search and rescue, fire fighting, humanitarian missions, scientific research, and the like.

Reference is made now to FIG. 1 illustrating the extended external fuel stores configuration of an F-16 aircraft, in accordance with the preferred embodiment of the invention. The drawing shows an aircraft 10 carrying diverse external stores uploaded on the standard weapon stations thereof. The external stores are designated by the numerals 1, 2, 3, 4, 5, 6, 7, 8, and 9 from the right to the left. The selected and implemented external stores constitute an extended external fuel stores configuration, which is functional in the performance of a mission involving a substantially increased quantity of fuel, such as a long-range deep patrol mission and the like. Thus, the aircraft 10 carries specifically selected stores operative in the accomplishment of the mission's objectives. The illustrated stores configuration includes two defensive counter-air missiles 1 and 9, such as the AIM-9 Sidewinder, uploaded on the left and the right wing tip stations respectively, two AAM missiles 2 and 8, such as the AIM-120 AMRAAM, on the left and right outer right wing weapon stations respectively, two standard external fuel drop tanks 3 and 7, such as a 370-gallon fuel tank, on the left and right outboard wing stations respectively, an ECM pod 5, such as the AN/ALQ-119, on the fuselage center line station, and two standard external fuel drop tanks 4 and 6, such as a 370-gallon fuel tank, on the left and right inboard wing stations respectively. It is important to note that the suspension and carriage of external fuel tanks 3 and 7 on the left and right outboard wing stations 3 and 7 is not certified in the external configuration options provided by the manufacturer. External stores 1, 2, 3, 4, 5, 6, 7, 8, and 9 are under the operational control of the aircraft crew located in the cockpit 100. The crew is interfacing with the weapon stations via an appropriate stores control interface (SCC) located in the cockpit. The SCC provides power application, operational control of the stores delivery system and visual indications concerning the status thereof. The SCC is interconnected with the external stores 1, 2, 3, 4, 5, 6, 7, 8, 9 via an onboard computer device (not shown), such as a microprocessor, a data bus including suitable data links (not shown), such as internal communication cables (not shown), fuel lines (not shown) compressed air lines (not shown), power lines (not shown) and data links for the delivery and control of the content of the external fuel stores from the standard external fuel tanks 4 and 6 and the auxiliary external fuel tanks 3 and 7 to the engine of the aircraft 10. The auxiliary fuel tank 3 is suspended on the supplier pylon 102 while the standard external fuel tank 4 is suspended on the receiver pylon 104. The supplier pylon 102 is connected to the receiver pylon 104 via an externally mounted Stores Transfer Kit (STK) (not shown). The STK includes fuel lines, compressed air lines, optional power lines and optional data control lines that connect the supplier pylon 102 and the receiver pylon 104 to enable integration of the auxiliary fuel tank 3 to the fuel system of the aircraft 10 via the receiver pylon 104. In a similar manner the auxiliary fuel tank 7 is attached to the supplier pylon 106 while the standard external fuel tank 6 is suspended on the receiver pylon (hidden on the drawing by the fuselage of the aircraft 10). The pylon supplier 106 is connected to the receiver pylon via an STK (not shown). The STK includes fuel lines, compressed air lines, optional power lines and optional data control lines that connect the supplier pylon 106 and the receiver pylon to effect the integration of the auxiliary fuel tank 7 to the fuel system of the aircraft 10 via the receiver pylon 106. Note should be taken that the above described configuration is exemplary only. In other embodiments additional auxiliary fuel tanks and associated supplier pylons could be uploaded on other weapon stations and additional STKs could connect the supplier pylons to an adjacent receiver pylon interfacing actually with the aircraft 10 fuel system. In the preferred embodiment of the invention, the addition of the auxiliary fuel tanks 3, 7 uploaded on "pseudo-wet/dry" points that were originally pre-defined by the manufacturer as "dry" points, substantially increase the quantity of fuel carried externally and thereby effect a substantial increase in the range, radius of action, mission time, performance and operational efficiency of the aircraft 10. It would be readily understood that the particular structure, size, dimensions of the STK and the precise location of STK relative to the aircraft wing will be determined in accordance with the type and variants of the specific aerial vehicles to which the proposed system and method will be applied in order to optimize the drag factor and to provide maximum structural strength and easy installation between the two pylons.

Figure 2:
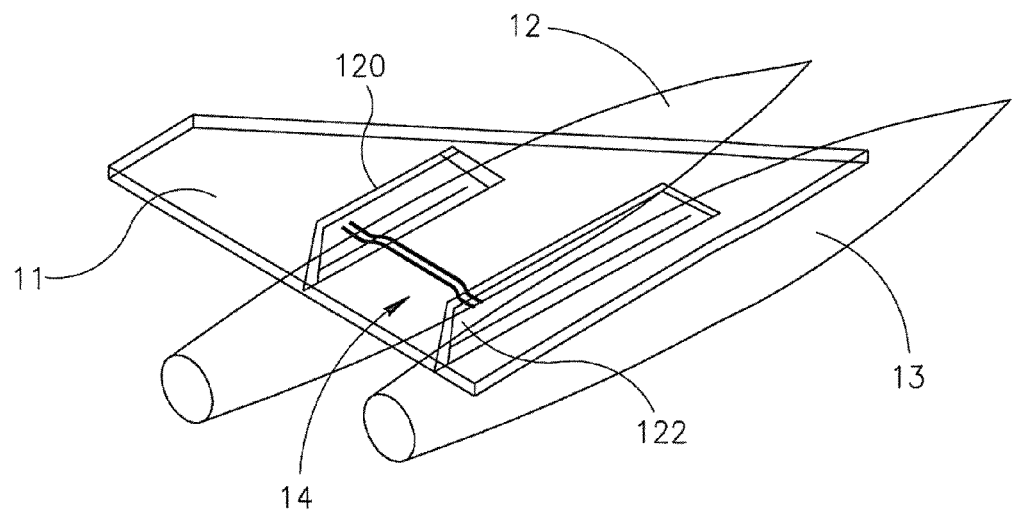
FIG. 2 is a view of the external fuel tanks carried on the hard points of an exemplary aircraft having an extended fuel stores configuration in accordance with the preferred embodiment of the present invention.

Referring to FIG. 2 that illustrates the transfer of fuel between two adjacent external fuel tanks 12 and 13. The tank 12 is suspended on the supplier pylon 120 while the standard fuel tank 13 is suspended on the receiver pylon 122. The receiver pylon 122 is connected both to the aircraft fuel system via the inboard wing stores station interface and to the supplier pylon 120 via the STK assembly. The supplier pylon 120 and the receiver pylon 122 are connected by the extension fuel lines, extension compressed air lines, optional extension power lines, and optional extension data control lines 14. In order to provide aerodynamic efficiency the extension lines 14 and the upper parts of both pylons are enclosed by a shared aerodynamically shaped conformal envelope 11. The receiver pylon 122 is provided with dual functionality. The first functionality regards the monitoring, control and transfer of the fuel stored in the fuel tank 13 suspended on the pylon 122. The pylon 122 supports the first functionality in the routine manner utilizing the in-built fuel and compressed air plumbing, the in-built electric wiring to provide for monitoring the amount of fuel in the fuel tank 13 and further providing all the standard options related to the fuel tank 13, such as jettisoning and the like. The second functionality is associated with the transfer of the fuel, the monitoring of the fuel quantity and general control of the operation of the fuel tank 12 suspended on the supplier pylon 120 via appropriate extension devices installed in the receiver pylon 122, in the supplier pylon 120 and in the STK assembly there between. The proposed arrangement provides an alternative external fuel transfer path, fuel delivery control path and optionally fuel quantity monitoring path to the fuel stored within the fuel tank 12 where the external path is formed via fuel tank 12, supplier pylon 120, the external extension fuel and control lines 14, receiver pylon 122, receiver pylon/aircraft wing interface (the inboard wing "wet" point) and the aircraft fuel system. In the preferred embodiment of the invention the jettisoning of the supplier pylon 120, fuel tank 12 and the external assembly is controlled directly through the supplier pylon/aircraft wing interface (the outboard "pseudo-wet/dry" point).

Figure 3:
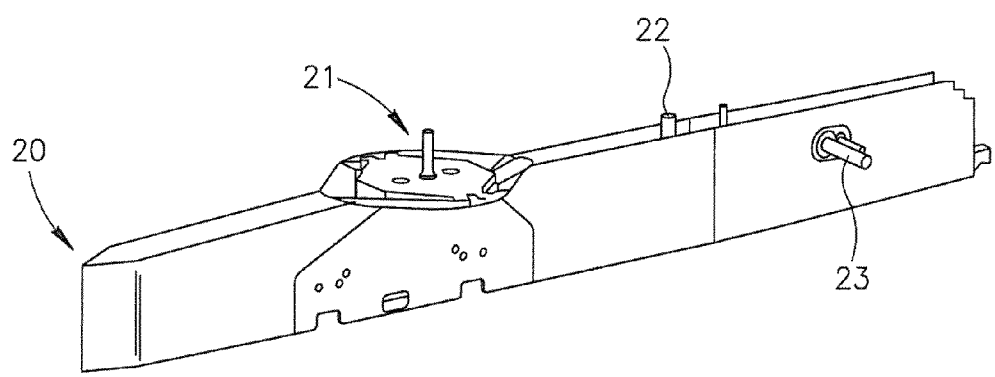
FIG. 3 is a side view of an external fuel tank pylon, referred to as the "receiver" pylon, operative in the carriage of an external fuel tank in the extended external fuel stores configuration, in accordance with the preferred embodiment of the present invention.

Referring now to FIG. 3 that shows the structure of the receiver pylon 20. The receiver pylon 20 is equivalent to the receiver pylon 122 illustrated in FIG. 2. The receiver pylon 20 is connected at one boundary to the aircraft fuel system via the interfacing electric connectors and fuel and compressed air attachments of its associated inboard wing "wet" stores station. The inboard wing station provides interface connectors to the fuel lines, compressed air lines, optional power lines and optional data communication lines between the aircraft and the receiver pylon 20. FIG. 3 illustrates the physical connectors 22 which are interfacing with the fuel system of the aircraft via the inboard wing stores station interface. The receiver pylon 20 is physically attached to the wing of the aircraft via an attachment device 21 in the manner known in the art. The fuel line connector, compressed air connector, optional power connector and optional data link connector 22 are interfacing with the appropriate connectors in the wing. On the other boundary point the pylon 20 is interfacing to the extension lines leading to and from the supplier pylon 120 of FIG. 2 by an extension connector assembly 23, which is designed to be connected to the extension lines linking to the supplier pylon 120 of FIG. 2. The connector assembly is shown at the aft of the receiver pylon 20. The assembly 23 is used for connecting the fuel lines, compressed air lines, optional power lines and data lines of the receiver pylon 20 to the respective fuel and compressed air plumbing and electric harness of the supplier pylon 120 of FIG. 2.

Figure 4:
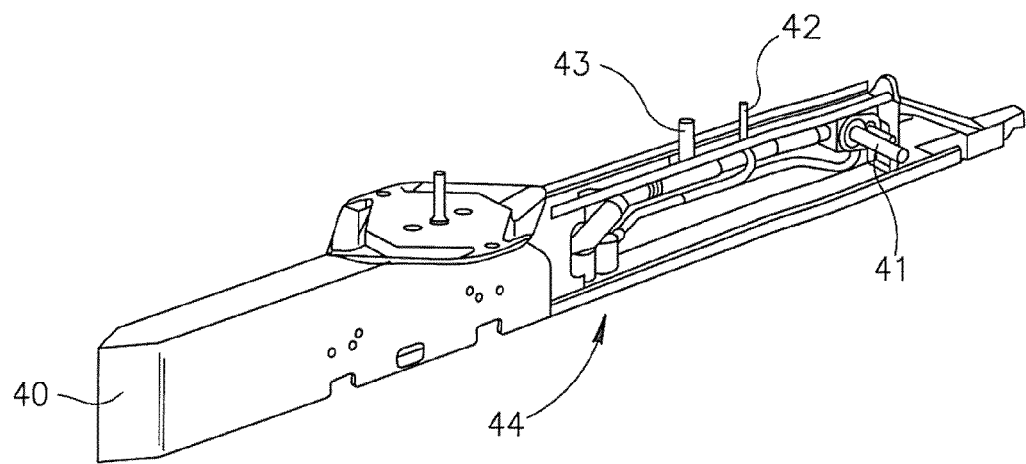
FIG. 4 is an elevated view of the external fuel tank pylon, referred to as the "receiver" pylon, operative in the carriage of an external fuel tank in the extended external fuel stores configuration, in accordance with the preferred embodiment of the present invention.

FIG. 4 shows a schematic view of the interior of the receiver pylon 40, which is equivalent to the receiver pylon 122 of FIG. 2 and to the receiver pylon 20 of FIG. 3. The receiver pylon 40 includes a compressed air line connector 42 to the aircraft wing, a fuel line connector 43 to the aircraft wing, and an integrated extension lines connector 41 designed to be connected to the extension lines leading to the supplier pylon 120 of FIG. 2. The attachment device 21 is located on a flat plate surface 31 designed to align the receiver pylon 40 to the aircraft's wing. The plate 31 with attachment device 21s located on the upper part of the receiver pylon 40. A stabilizer screw 32 placed on the rear of the receiver pylon 40 is designed to form a firm connection to the wing of the aircraft for further stabilizing the pylon 40 during flight. The fuel line, compressed air line, optional power line, and optional data control line are bundled into the integrated connector 41 designed to be linked to the extension lines leading to the supplier pylon 120 of FIG. 2.

Figure 5:
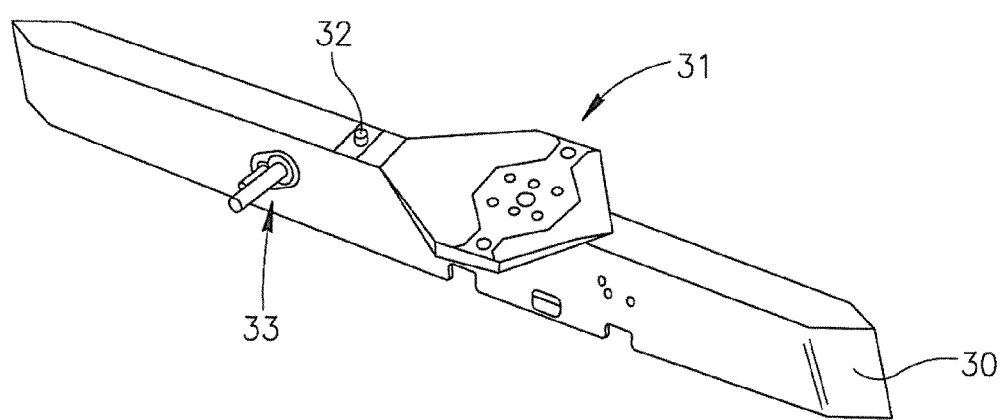
FIG. 5 is an elevated view of and external fuel tank pylon, referred to as the "supplier pylon", operative in the carriage of an external fuel tank in the extended external fuel stores configuration, in accordance with the preferred embodiment of the present invention.

FIG. 5 illustrates the structure of the supplier pylon 30. The supplier pylon 30 is equivalent to the supplier pylon 120 illustrated in FIG. 2. The supplier pylon 30 is not connected to the aircraft fuel system directly via the outboard wing "pseudo-wet/dry" stores station on which the pylon 30 is suspended. The supplier pylon 30 is physically attached to the wing of the aircraft via attachment device 31 that includes a stabilizer plate, and several attachment screws. An additional aft screw 32 is provided to make sure the firm attachment of the supplier pylon 30 to the aircraft wing. The integrated extension lines connector 33 includes a fuel line extension connector, a compressed air line connector, an optional power connector, and an optional data control link connector is designed to be connected to the extension lines leading from and to the receiver pylon 122 of FIG. 2. The pylon 30 is linked to the a jettison control connector located in the pylon/aircraft wing interface via a specific wiring harness (not shown) in order to enable emergency jettisoning of a) the fuel tank b) the fuel tank and the supplier pylon c) the fuel tank, the supplier pylon, and the STK.

Figure 6:
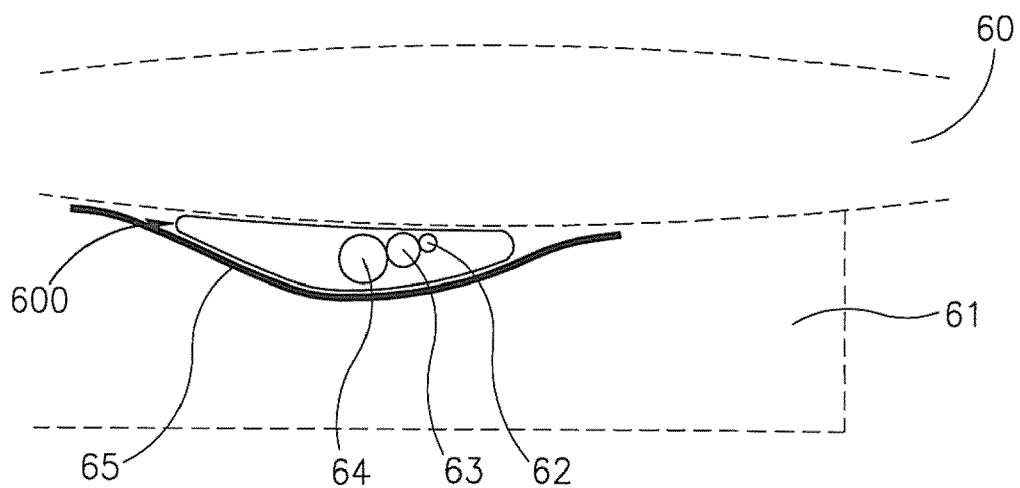
FIG. 6 is a schematic diagram of an external fuel tank uploaded on the wing of an exemplary aircraft having an extended external fuel stores configuration, in accordance with the preferred embodiment of the present invention.

Referring now to FIG. 6 that is a partial cross-sectional view of the aircraft wing, the supplier pylon, the extension line connectors, and the STK. The supplier pylon 61 is physically attached to the outboard wing station of the aircraft wing 60. The aerodynamic covering 65 of the STK encloses the integrated extension connector including a fuel line connector 64, a compressed air connector 63, and an optional power line and an optional data link connector 62. Due to the aerodynamic shape of the covering 65 and due to the fact that the extension lines are located as close to the wing surface as possible the aerodynamic drag effects of the external assembly will be minimal.

The vertical depth of the STK envelope depends on a given gauge size of the extension fuel lines and the extension compressed air lines. Large gauge extension fuel lines and compressed air lines necessitate the forming of a vertically deeper STK covering while the utilization of small-diameter extension lines enable the placement of the STK covering closer to the wing lower surface. As the size of the STK directly affects drag a variety of extension line gauges could be provided. Although small diameter extension lines effect reduced fuel transfer rates and consequently places limitations of the selectable propulsion modes, the fuel from the fuel tanks attached to the supplier pylons is typically utilized in the initial stages of the mission where fuel consumption-extensive propulsion modes are not usually required. The given gauge of the extension lines associated with the STK further effects the transfer rate of fuel from a tanker aircraft to the carrier aircraft and thereby having a significant impact on the required duration of an aerial refueling operation.

In the preferred embodiment of the invention, in order to control the delivery of the additional fuel stored in the auxiliary fuel tanks 3 and 7 of FIG. 1 the SCC in the cockpit should be suitably upgraded. An exemplary upgrade could include an enhanced fuel quantity display that shows the quantity of fuel in each of the uploaded fuel tanks and indicator lights (LEDs) signifying fuel transfer and/or lack of transfer and/or state of fuel in each uploaded fuel tank. The exemplary upgrade could also involve the addition of an external fuel delivery selector switch. The selector switch enables the aircraft crew to control the operation of the fuel transfer valve located in the external fuel tanks associated with the receiver pylons. When activated the selector switch blocks the transfer of fuel from the fuel tanks associated with the receiver pylons and will give priority to the transfer of fuel from the fuel tanks suspended on the supplier pylons. The alternative external delivery path of the fuel from the auxiliary fuel tanks is formed in the following manner: Fuel is pumped by air pressure from the auxiliary fuel tank to the supplier pylon fuel line, to the extension fuel line connector in the supplier pylon, to the extension fuel line in the STK, to the extension fuel line connector in the receiver pylon, to the receiver pylon fuel line, to the fuel connector in the receiver pylon/aircraft wing interface (on the inboard wing "wet" station) and the aircraft fuel system. When the level of the fuel in the auxiliary tanks falls to a pre-defined minimum value, a suitable "empty" or "no transition" signal will be transmitted via the data control links to the stores control computer. The appearance of the signal will override the selector switch. Consequently the opening of the fuel transfer valves in the fuel tanks associated with the receiver pylons will be effected and transfer of fuel will begin from the fuel tanks associated with the receiver pylons. The delivery path of the fuel from the fuel tanks associated with the receiver pylons is straightforward. The fuel will be impelled by air pressure to exit from the fuel tank to the fuel line in the receiver pylon, to the receiver pylon/aircraft wing interface (on the inboard wing "wet" station), to the aircraft fuel system and finally to the power plants of the aircraft.

The above-described mechanism is exemplary only. In other embodiments of the present invention different simpler structural and functional arrangements could be used, such as T-valves, to accomplish a transparently pre-defined sequence of delivery of the fuel load from the fuel tank attached to the supplier pylon and from the fuel tank attached to the receiver pylon to the aircraft fuel system. The T-valves could be located on the receiver pylons in such as manner as to allow for the delivery of the fuel from the fuel tank suspended on the supplier pylon prior to the delivery of the fuel load from the fuel tank associated with the receiver pylon. In further other embodiments different mechanisms could be used to provide for automatic, semi-automatic, manual (or the combination thereof) of the control of the fuel transfer sequence.

Although in the preferred embodiment of the invention the receiver pylon is a conventional fuel tank carrier pylon operationally adapted to have dual functionality including as standard external fuel tank carrier and fuel delivery supporting functionality and extended fuel delivery supporting functionality it would be readily understood by one with ordinary skills in the art that in other preferred embodiments the receiver pylon could be a specifically designed and developed device provided with an integral pre-built mechanism for the support of fuel delivery from the proposed extended external fuel stores configuration to the aircraft fuel system.

The extended external fuel stores configuration proposed by the system and method of the present invention utilize existing hard points on the external surface of the aircraft. Note should be taken that the existing hard points adapted to the attachment of a receiver pylon and/or a supplier pylon retain their original alternative functionalities, such as, for example, the support of a weapon pod. Thereby the option of suspending an externally mounted standard stores on the particular hard point is still assured.

The design of the proposed system and method will substantially cover all the options and possibilities of fuel tank carriage including the jettisoning of the tanks, the pylons and the STK assembly from both the "dry" stations and "wet" stations. The preferred embodiment of the present invention could include several exemplary jettison options where the options are provided in accordance with several factors, such as cost, operational requirements, certifications capabilities, development risks, the type of the aircraft and the variants thereof and the like. Possible jettisoning options include: a) jettisoning the fuel tank only b) jettisoning the pylon and the attached fuel tank c) jettisoning of the STK in order to optimize drag and reducing negative aerodynamic phenomena, such as flutter, when accomplishing a "clean" external configuration (without external stores and stores carriers). The jettisoning is performed in the manner known in the art where the operative signals operative to the activation of the jettisoning process are transmitted from the SCC in the cockpit and fed to the supplier pylon via the standard jettison system interface, such as a suitable electric connector on the surface of the wing. In other preferred embodiment other possible options could be used.

Note should be taken that the Stores Transfer Kit (STK) assembly is essentially an externally mounted extension mechanism linking two or more external stores carriers for the purpose of creating an alternative transfer path of stores among the two or more stores carriers. In the preferred embodiment of the present invention the stores transferred are fuel stores. Conceivably, in other embodiments of the invention, other types of external stores could be transferred among two or more external stores carriers, such as for example RF and thermal countermeasures, projectiles, and the like by utilizing alternative versions of the STK having alternative structure, design and functionality. In yet other embodiments of the invention, the extension lines of the STK could be connected to specific existing or prospective aircraft outlets in order to transfer stores between internal and external stores in both directions.

The operative elements of the proposed extended fuel stores configuration could be used on extremely long-range missions, such as aircraft ferrying, alongside other existing fuel carriage enhancement solutions, such as for example the Conformal Fuel Tanks (CFT) system developed for carriage on the F-15 Eagle aircraft and the F-16 Fighting Falcon aircraft.

The advantages inherent in the system and method proposed by the present invention were demonstrated by the foregoing description of the preferred embodiment. It would be easily perceived by one with ordinary skill in the art that the described embodiment is exemplary only. The system and method proposed allows for a plurality of alternative internal and external formations, options, versions, configurations, arrangements, and applications. The foregoing descriptions were provided only for enabling a ready understanding of the concepts underlying the present invention and should not be interpreted in as limiting.

Therefore, it will be appreciated by persons with ordinary skills in the art that the present invention is not limited to what has been particularly shown and described hereinabove. The scope of the present invention is defined only by the claims, which follow.

I claim:

1. A system for increasing fuel storage volume and fuel carriage capacity of external fuel stores suspended on an aerial vehicle by formation of at least one external extended fuel stores configuration, the system comprising:
at least one single functionality external fuel tank carrier pylon providing fuel tank carriage capability and fuel transfer and control capabilities from at least one externally carried fuel tank;
at least one dual functionality external fuel tank carrier pylon providing fuel tank carriage capability and fuel transfer and control capabilities from at least one externally carried fuel tank and to support fuel transfer and control capabilities for the at least one single functionality external fuel tank carrier pylon;
at least one externally mounted Stores Transfer Kit to provide enclosure for at least one external fuel line and at least one external fuel control line linking between the at least one single functionality external tank carrier pylon and the at least one dual functionality external tank carrier pylon, said external fuel line is located externally to the aerial vehicle and connected to an existing fuel system of the aerial vehicle;
whereby an alternative external fuel transfer and fuel control path is established between at least one external fuel tank carried by the at least one single functionality external fuel tank carrier pylon and the fuel system of the aerial vehicle via the at least one externally mounted Stores Transfer Kit and the at least one dual functionality external fuel tank carrier pylon, such that the at least one external fuel tank carried by the at least one single functionality external fuel tank carrier pylon is enabled to provide fuel directly to the fuel system of the aerial vehicle.

2. The system according to claim 1 wherein the at least one single functionality external fuel tank carrier pylon further comprises the elements of:
at least electrical connector to link an electrical control system of the at least one single functionality external tank carrier pylon to a fuel system of the aerial vehicle;
at least one fuel connector to link a fuel transfer system of the at least one single functionality external fuel tank carrier pylon to at least one fuel extension line installed in the at least one externally mounted Stores Transfer Kit;
at least one compressed air connector to link a compressed air system of the at least one single functionality external fuel tank carrier pylon to at least one compressed air extension line installed in the at least one externally mounted Stores Transfer Kit;
at least one electric power and signal connector to link an electrical control system of the at least one single functionality external fuel tank carrier pylon to at least one electrical and signal line installed in the at least one externally-mounted Stores Transfer Kit.

3. The system according to claim 1 further comprises the elements of:
at least one fuel quantity monitoring device to display the quantity of fuel store in the at least one external fuel tank carried by the at least one single functionality external fuel tank carrier pylon; at least one display device to indicate the status of the at least one external fuel tank and the status of the at least one single functionality external fuel tank carrier pylon;
at least one control device to control the fuel transfer sequence from the operative fuel containers constituting the external extended fuel stores configuration.

4. The system according to claim 1 wherein the at least one single functionality external fuel tank carrier pylon is a novel, specifically designed and developed device.

5. The system according to claim 1 wherein the elements of the extended external fuel stores configuration are transparent to the aerial vehicle.

6. The system according to claim 1 wherein the elements of the extended fuel stores configuration are detachably installed on an aerial vehicle.

7. The system according to claim 1 wherein the elements of the external extended fuel stores configuration include secondary control and emergency release means.

8. The system according to claim 1 wherein the at least one dual functionality external fuel tank carrier pylon is suspended on an inboard "wet" stores station having fuel transfer, control, refueling, monitoring, and jettisoning capabilities.

9. The system according to claim 1 wherein the externally mounted Stores Transfer Kit includes extension fuel lines and extension compressed air lines with a variety of gauge sizes.

10. The system according to claim 1 wherein the at least one dual functionality external fuel tank carrier pylon further comprises:
at least one first fuel connector to link a fuel transfer system of the at least one dual functionality external fuel tank carrier pylon to at least one fuel connector of the aerial vehicle fuel system;
at least one first compressed air connector to link a compressed air system of the at least one dual functionality external fuel tank carrier pylon to at least one compressed air connector of the aerial vehicle fuel control system;
at least one first electric power and signal connector to link an electrical system of the at least one dual functionality external fuel tank carrier pylon to at least one electrical and signal connector of the aerial vehicle fuel control system;
at least one second fuel connector to link the fuel transfer system of the at least one dual functionality external fuel tank carrier pylon to at least one fuel extension line installed in the at least one externally mounted Stores Transfer Kit;
at least one second compressed air connector to link the compressed air system of the at least one dual functionality external fuel tank carrier pylon to at least one compressed air extension line installed in the at least one external externally mounted Stores Transfer Kit;

at least one second electric power and signal connector to link the electrical system of the at least one dual functionality external fuel tank carrier pylon to at least one electrical and signal line installed in the at least one external externally mounted Stores Transfer Kit.

11. The system according to claim 10 wherein the dual functionality external fuel tank carrier pylon further comprises a specific indicator to control the transfer sequence of the fuel stored in the at least one fuel tank suspended on the at least one single functionality external fuel carrier pylon and in the at least one external tank suspended on the at least one dual functionality external fuel tank carrier pylon.

12. The system according to claim 1 wherein the at least one externally mounted Stores Transfer Kit comprises the elements of:
- at least one aerodynamically shaped external envelope to protect the enclosed internal elements and to provide aerodynamic efficiency to the aerial vehicle to which the extended external fuel stores configuration is applied;
- at least one extension fuel line linking a fuel transfer system of the at least one single functionality external fuel tank carrier pylon to a fuel transfer system of the at least one dual functionality external fuel tank carrier pylon;
- at least one extension compressed air line linking the compressed air system of the at least one single functionality external fuel tank carrier pylon to a compressed air system of the at least one dual functionality external fuel tank carrier pylon;
- at least one extension electric power and signal line linking an electrical system of the at least one single functionality external fuel tank carrier pylon to the electrical system of the at least one dual functionality external fuel tank carrier pylon.

13. The system according to claim 12 wherein the externally mounted Stores Transfer Kit is substantially re-configurable according to the types and variants of the aerial vehicles to provide for optimal aerodynamic characteristics and acceptable flight envelope.

14. The system according to claim 12 wherein the externally mounted Stores Transfer Kit is operative in the transfer of fuel stores between at least two stores carriers.

15. The system according to claim 12 wherein the externally mounted Stores Transfer Kit is operative in the transfer of stores between an external store and an internal store.

16. The system according to claim 1 wherein the aerial vehicle is a multi-role military aircraft.

17. The system according to claim 16 wherein the aerial vehicle is a F-16 Fighting Falcon multi-role fighter aircraft.

18. The system according to claim 1 wherein the dual functionality external fuel tank carrier pylon is an external fuel tank carrier pylon converted to dual functionality role.

19. The system according to claim 18 wherein the at least one dual functionality external fuel tank carrier pylon is specifically designed to provide fuel tank carriage capability and fuel transfer and control capabilities.

20. The system according to claim 1 wherein the at least one single functionality external fuel tank carrier pylon is suspended on at least one outboard wing "pseudo-wet" stores station having jettisoning capabilities.

21. The system according to claim 20 wherein comprising a at least one outboard stores station is provided with a dual "pseudo-wet/dry" functionality allowing and supporting the carriage of at least one single functionality external fuel tanker pylon and other pre-defined stores.

* * * * *